(12) United States Patent
Queveau et al.

(10) Patent No.: US 6,312,041 B1
(45) Date of Patent: Nov. 6, 2001

(54) COLLAPSIBLE ROOF FOR VEHICLE SUCH AS A TRUCK, VAN OR BREAK

(75) Inventors: Gérard Queveau; Paul Queveau; Jean-Marc Guillez, all of Cerizay (FR)

(73) Assignee: France Design, Cerizay (FR)

( * ) Notice: Subject to any disclaimer, the term of this patent is extended or adjusted under 35 U.S.C. 154(b) by 0 days.

(21) Appl. No.: 09/555,322

(22) PCT Filed: Sep. 22, 1999

(86) PCT No.: PCT/FR99/02252

§ 371 Date: May 24, 2000

§ 102(e) Date: May 24, 2000

(87) PCT Pub. No.: WO00/17001

PCT Pub. Date: Mar. 30, 2000

(30) Foreign Application Priority Data

Sep. 24, 1998 (FR) .................................................. 98 11951

(51) Int. Cl.[7] .................................. B60J 7/02; B60J 7/047
(52) U.S. Cl. .................................. 296/107.17; 296/107.18; 296/107.2; 296/108
(58) Field of Search .......................... 296/108, 107.17, 296/107.18, 107.2, 103, 105, 106

(56) References Cited

U.S. PATENT DOCUMENTS

| | | | |
|---|---|---|---|
| 1,539,995 | * | 6/1925 | Dickman ............................ 296/108 |
| 3,575,464 | | 4/1971 | Himka et al. . |
| 4,711,485 | * | 12/1987 | Maebayashi et al. ............... 296/108 |
| 4,818,009 | * | 4/1989 | Muscat .................................. 296/106 |
| 4,854,634 | * | 8/1989 | Shiraishi et al. ..................... 296/108 |
| 5,029,932 | * | 7/1991 | Parr ....................................... 296/107 |
| 5,207,474 | * | 5/1993 | Licher et al. ......................... 296/107 |
| 5,520,432 | * | 5/1996 | Gmeiner et al. ..................... 296/107 |
| 5,584,522 | * | 12/1996 | Kerner et al. ..................... 296/37.16 |
| 5,743,587 | * | 4/1998 | Alexander et al. .................. 296/108 |
| 5,769,483 | * | 6/1998 | Danzl et al. ......................... 296/107 |
| 5,810,422 | * | 9/1998 | Corder et al. ........................ 296/108 |
| 5,833,300 | * | 11/1998 | Russke ................................. 296/108 |
| 6,139,087 | * | 10/2000 | Wolfmaier et al. ............. 596/107.16 |
| 6,149,223 | * | 11/2000 | Baessler et al. ................ 296/146.14 |

FOREIGN PATENT DOCUMENTS 2 699 868   12/1992  (FR) .

* cited by examiner

Primary Examiner—Stephen T. Gordon
Assistant Examiner—Greg Blankenship
(74) Attorney, Agent, or Firm—Harness, Dickey & Pierce, P.L.C.

(57) ABSTRACT

The invention concerns a roof (1) extending between the windscreen upper rim (2) and the top edge (3) of a bow (4) extended upwards. The roof (1) is in two parts (8, 9), the first part (8) located near the bow (4) being linked with the vehicle lateral part (10) by two articulated arms (11, 12) mobile between a position extending upwards wherein said roof first part (8) is located in front of the bow (4) and a tilted position towards the rear wherein said arms (11, 12) and said roof first part (8) are located in the rear trunk (5), the second roof part (9) being linked to the first part by means enabling the second roof part (9) to be moved onto the first part (8) when the arms (11, 12) are tilted.

13 Claims, 5 Drawing Sheets

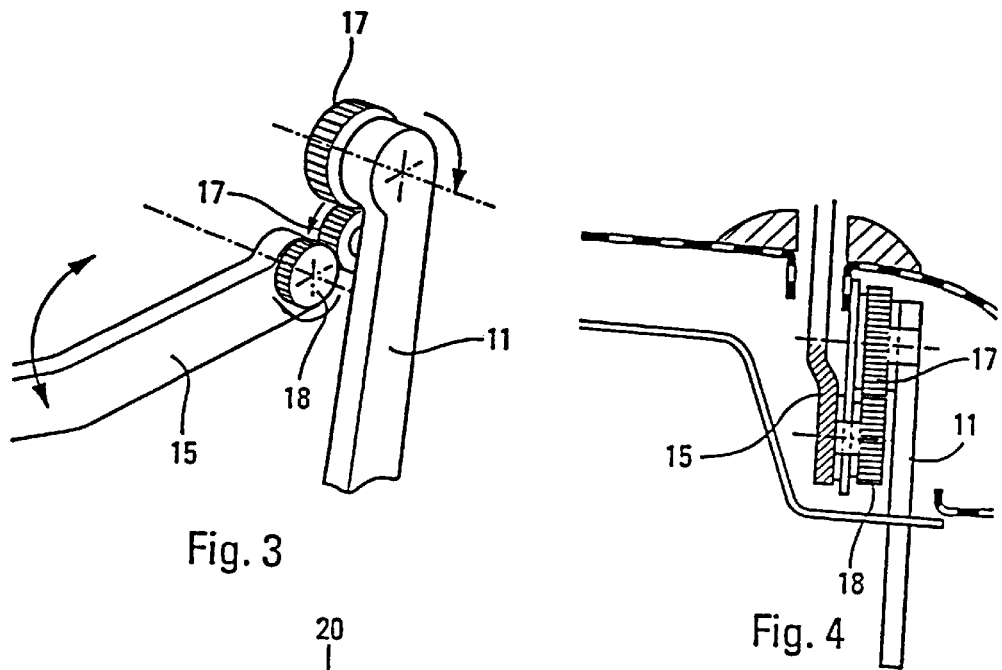
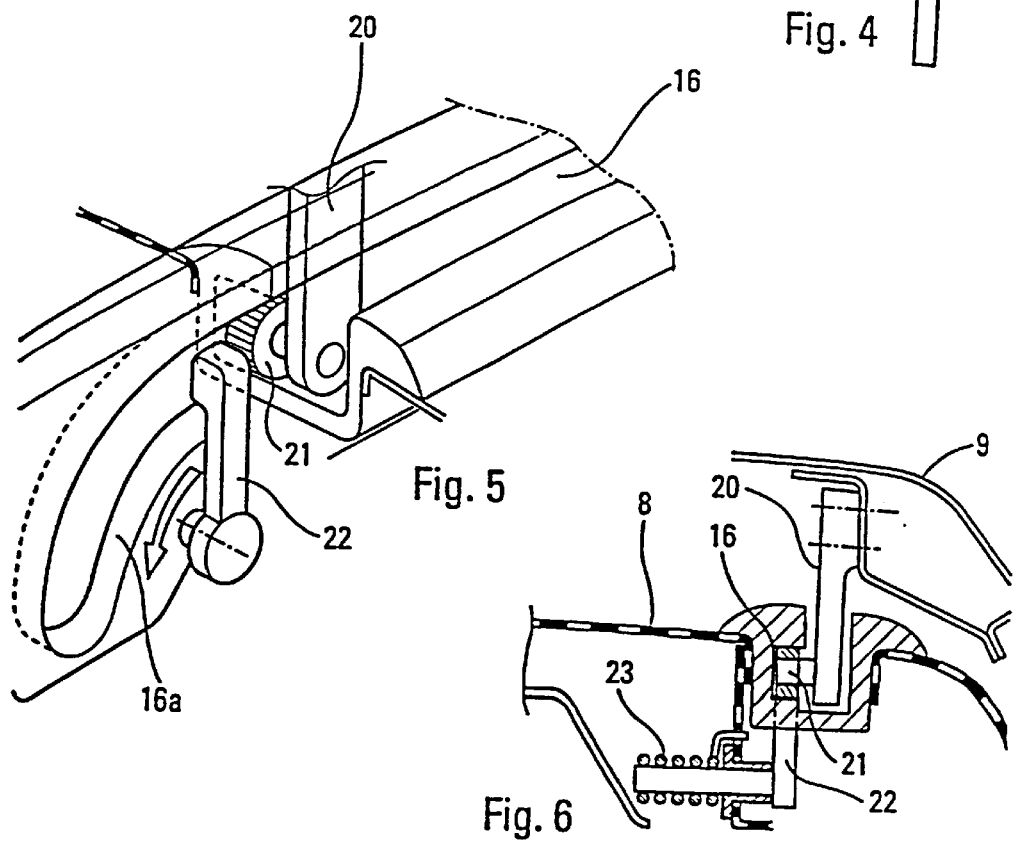

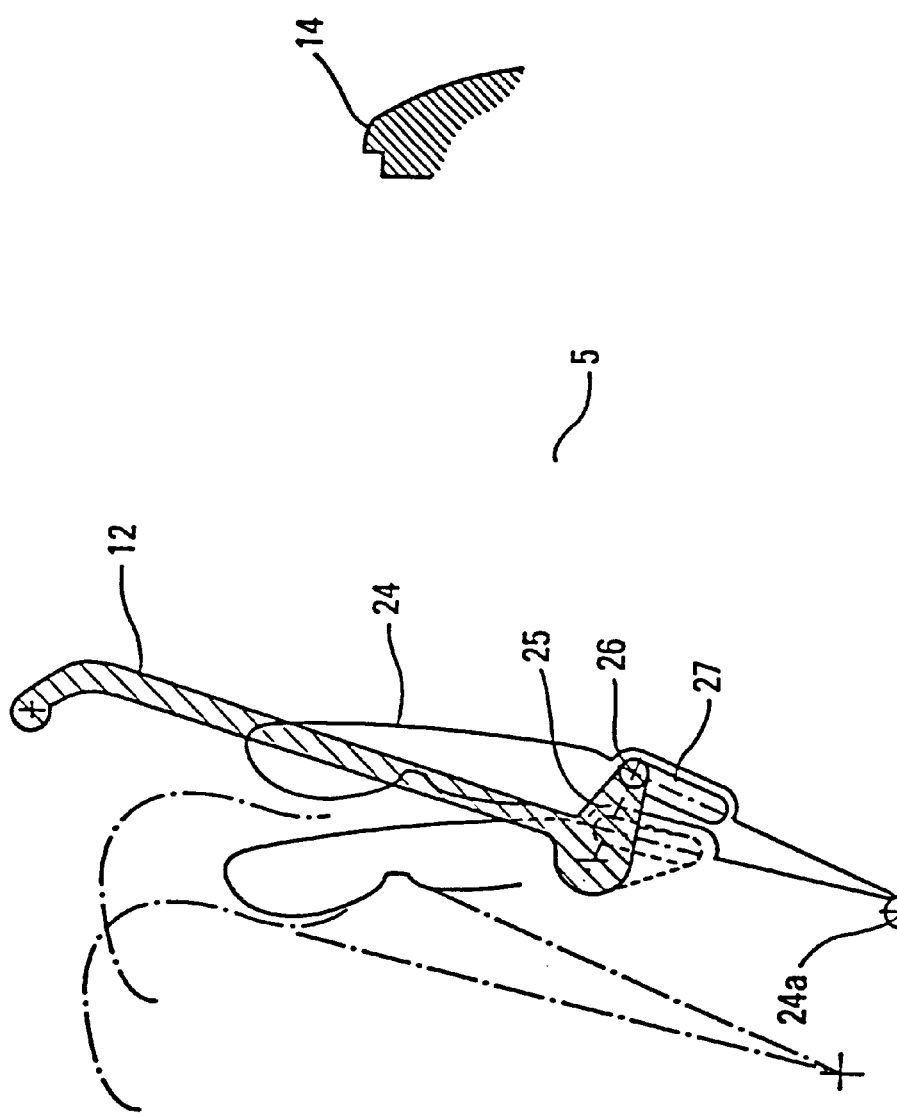

COLLAPSIBLE ROOF FOR VEHICLE SUCH AS A TRUCK, VAN OR BREAK

BACKGROUND OF THE INVENTION

Vehicles with a retractable roof are currently available based on sedans or coupes referred to as cabriolets.

Rigid roof cabriolets have a typical profile (short roof and trunk) which enables the roof to be retracted into the trunk using technologies known in the art.

SUMMARY OF THE INVENTION

The objective of the present invention is to extend the retractable roof facility to horsebox, panel truck or station wagon type vehicles in order to offer open roof options on a rigid roof vehicle base.

The major problem with the above type of vehicle is obviously the profile of the roof area not predisposed to simple retraction offering appropriate criteria of habitability and trunk volume in both positions.

The object of the invention is entirely automatic and on-board roof retraction by simple means degrading neither the habitability of the vehicle nor the volume of the trunk.

The invention therefore provides a retractable roof for horsebox, panel truck or station wagon type vehicles, including a roof extending between the top edge of the windshield and the top edge of an upstanding arch member above the front part of the trunk and an at least partially glazed rear part extending between the arch member and the rear of the trunk.

According to the invention, the roof is in two parts, the first part near the arch member being connected to the lateral part of the vehicle by two articulated arms mobile between an upright position in which said part of the roof is in front of the arch member and a position swung toward the rear in which said arms and said first part of the roof are in the trunk, the second part of the roof being connected to the first part by means for moving the second part of the roof over the first part when the arms swing.

When the two arms swing toward the trunk the two roof parts are moved under the arch member and locate one over the other in the trunk, occupying a small volume thereof.

In a preferred version of the invention said rear part between the arch member and the rear of the trunk pivots about an axis near the rear top edge of the trunk so that it can be swung into the trunk.

The retractable roof preferably includes means for automatically and successively swinging said rear part toward the inside of the trunk, swinging said arms toward the inside of the trunk and simultaneously moving the second part of the roof over the first part.

Other features and advantages of the invention will become more apparent in the course of the following description.

DETAILED DESCRIPTION OF THE DRAWINGS

In the accompanying drawings, which are provided by way of non-limiting example:

FIG. 3 is a perspective view showing the detail A from FIG. 1;

FIG. 4 is a view in cross section showing the detail A;

FIGS. 5 and 6 are respectively perspective and cross-sectional views showing the detail B from FIG. 1;

FIG. 7 is a side view showing the mechanism controlling the pivoting of the rear seat back.

DETAILED DESCRIPTION OF THE INVENTION

Figure 1:
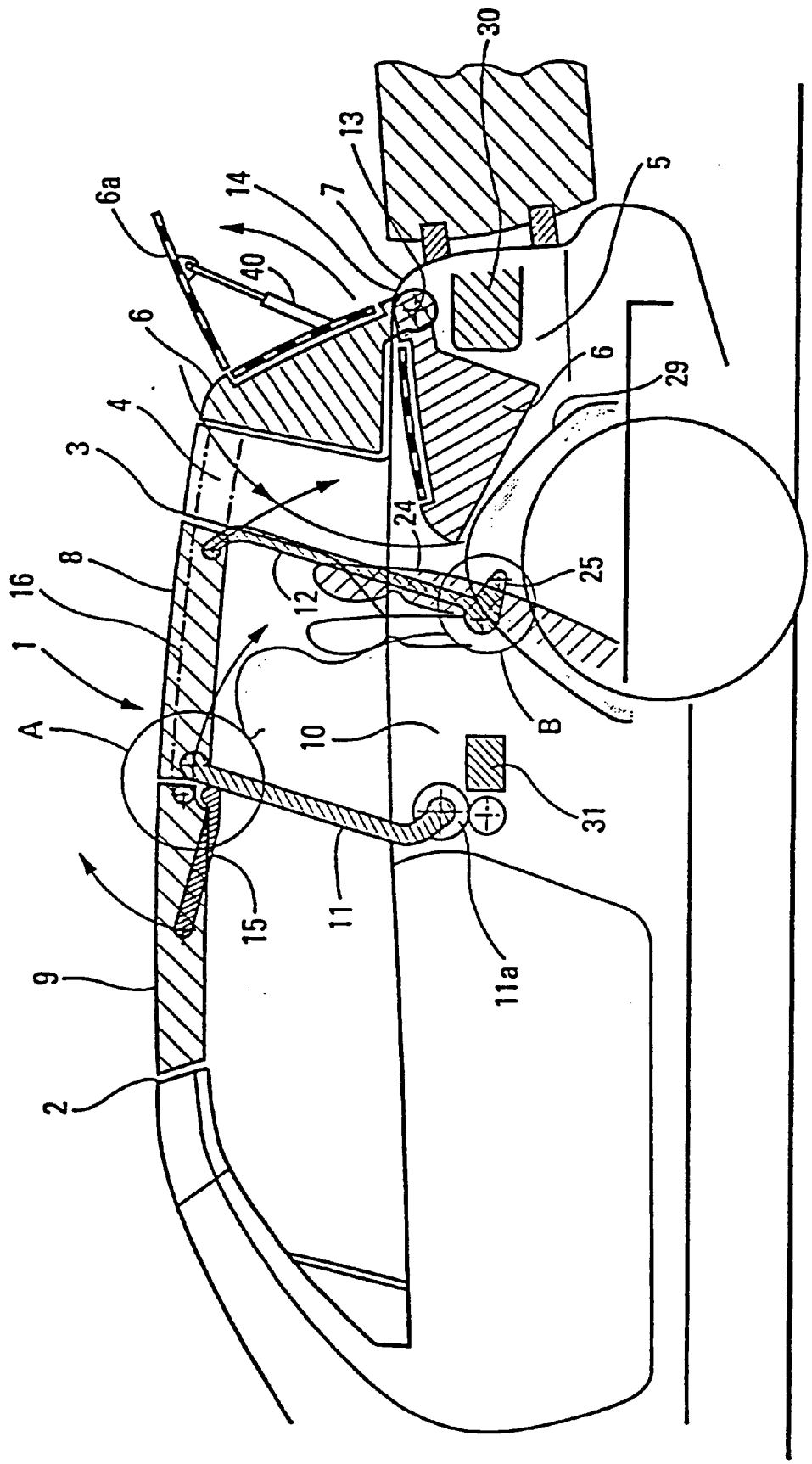
FIG. 1 is a partly sectioned side view of a vehicle equipped with a retractable roof according to the invention.
Figure 2:
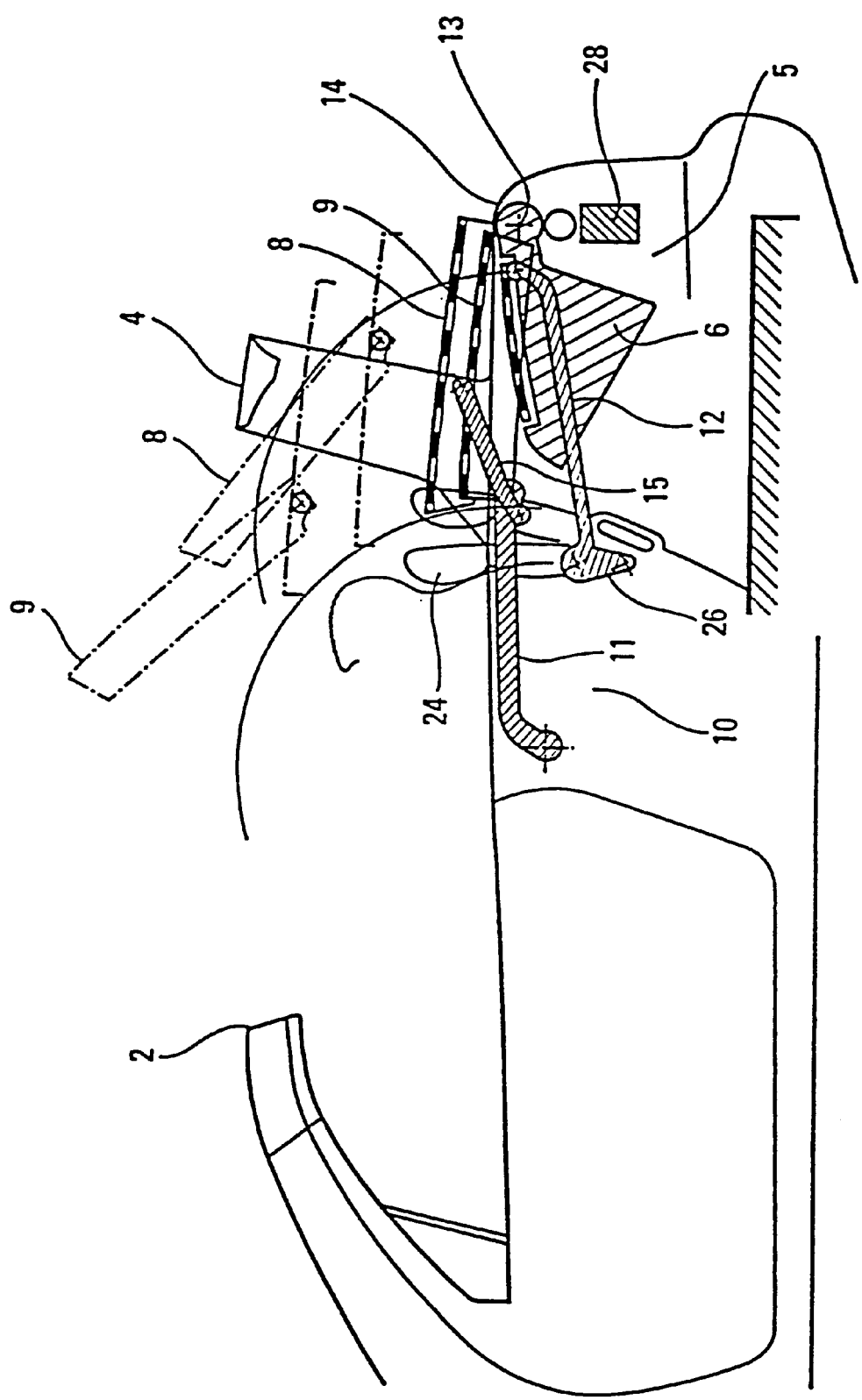
FIG. 2 is a view analogous to FIG. 1 showing the roof and the rear part folded into the trunk.

In the embodiment of the invention shown in FIGS. 1 and 2 the retractable roof for horsebox, panel truck or station wagon type vehicles comprises a roof 1 extending between the upper edge 2 of the windshield and the upper edge 3 of an upstanding arch member 4 above the front part of the trunk 5. A rear part 6 which is at least partly glazed extends between the arch member 4 and the rear 7 of the trunk 5.

In accordance with the invention, the roof 1 is in two parts 8, 9. The first part 8 near the arch member 4 is connected to the lateral part 10 of the vehicle by two articulated arms 11, 12 mobile between an upright position (see FIG. 1) in which the first part 8 of the roof is in front of the arch member 4 and a position swung to the rear (see FIG. 2) in which the arms 11, 12 and the first part 8 of the roof are in the trunk 5.

The second part 9 of the roof is connected to the first part 8 by means enabling the second part 9 of the roof to move over the first part 8 as the arms 11, 12 swing.

Thus when stowed in the trunk the two parts 8, 9 of the roof are superposed and partially nested one within the other, as shown in FIG. 2.

The rear part 6 between the arch member 3 and the rear 7 of the trunk 5 pivots about an axis 13 close to the top rear edge 14 of the trunk 5 so that it can swing into the trunk 5, as shown in FIGS. 1 and 2.

The retractable roof according to the invention includes means which automatically and successively command swinging of the rear part 6 toward the interior of the trunk 5, swinging of the arms 11, 12 toward the interior of the trunk 5 and simultaneous displacement of the second part 9 of the roof over the first part 8.

The movement of the second part 9 of the roof over the first part 8 is assured, on the one hand, by a pivoting link 15 providing an articulated connection between the two roof parts, 8, 9 and, on the other hand, by a slide 16 running along the first roof part 8 to guide sling of the second roof part 9 over the first roof part 8.

The link 15 is caused to pivot by the angular motion of the arm 11 connected to the first roof part 8 closest to the second roof part 9.

FIGS. 3 and 4 show that the end of the arm 11 carries a gear 17 meshing with a gear 18 at the end of the link 15 via an intermediate gear 19 so that the link 15 rotates in the same direction as the arm 11.

The second roof part 9 carries an arm 20 (see FIGS. 5 and 6) incorporating a roller 21 engaged in the slide 16 on the first roof part 8.

FIG. 5 also shows that the front part 16a of the slide 16 is in the shape of a circular arc to enable the second roof part 9 to be offset upward on opening the roof.

When the roller 21 on the arm 20 is engaged in the circular arc part 16a of the slide the arm 20 bears against a pivoted finger 22 which is spring-loaded by a spring 23 urging the arm 20 upward to facilitate sliding of the part 9 relative to the roof part 8.

As shown in FIGS. 1, 2 and 7 the front part of the trunk 5 is closed by the rear seat back 24 of the vehicle. The seat back 24 can pivot toward the front about an axis 24a when the two roof parts 8, 9 move toward the trunk 5.

This increases the length of the trunk 5 to facilitate access thereto by the roof parts 8, 9.

The seat back 24 is pivoted by a mechanism connecting the arm 12 connected to the first part 8 of the roof to the seat back 24.

This mechanism includes a lug 25 connected to the end of the arm 12 opposite the first roof part 8. The end of this lug 25 carries a roller 26 engaged in a groove 27 fastened to the seat back 24.

The rear part 6 includes a window 6a that can be opened in an upward direction by a cylinder 40.

The operation of the retractable roof just described will now be explained.

The first operation for opening the roof is for an electric motor 28 to swing the rear part 6 into the trunk 5 (see FIG. 2).

When the rear part 6 is in the trunk 5, its shape fits perfectly between the wheel arches 29 and the rear light assemblies 30, which project into the trunk.

An electric motor 31 then pivots the arm 11 connected to the roof part 8 about its bottom axis 11a.

On pivoting toward the rear the two arms 11, 12 move the two roof parts 8, 9 toward the trunk 5, under the arch member 4.

As the arms 11, 12 pivot toward the rear, and via the gears 17, 19, 18, the angular motion of the arm 11 rotates the link 15 in the same direction as the arm 11.

The roof part 9 then slides over the roof part 8 by virtue of the groove 16 and the roller 21 carried by the arm 20.

At the end of this travel, the two roof parts 8, 9 are in the trunk 5, partially nested one within the other and occupying only a small height.

To facilitate access to the trunk 5 by the two roof parts 8, 9, the rear seat back 24 is pivoted slightly toward the front by the mechanism associated with the swing-arm 12.

Of course, the invention is not limited to the embodiment just described and many modifications can be made thereto without departing from the scope of the invention.

Figure 8:
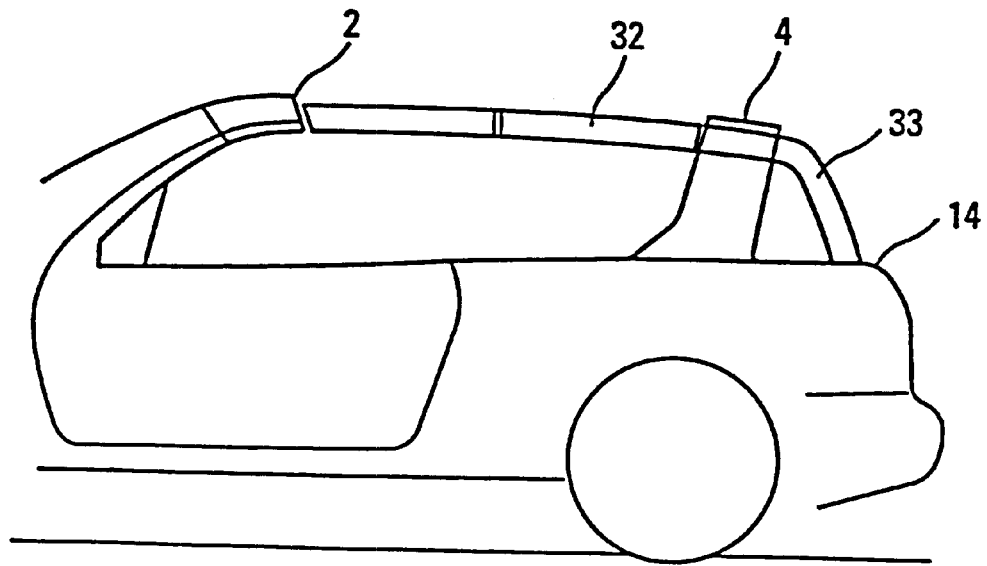
FIGS. 8 and 9 show two embodiments of the invention.

Thus, as shown in FIG. 8, the structure of the vehicle could if necessary be strengthened by rigid members 32, 33 extending between the front edge 2 and the arch member 4 and/or between the arch member and the top rear edge 14 of the trunk.

Figure 9:
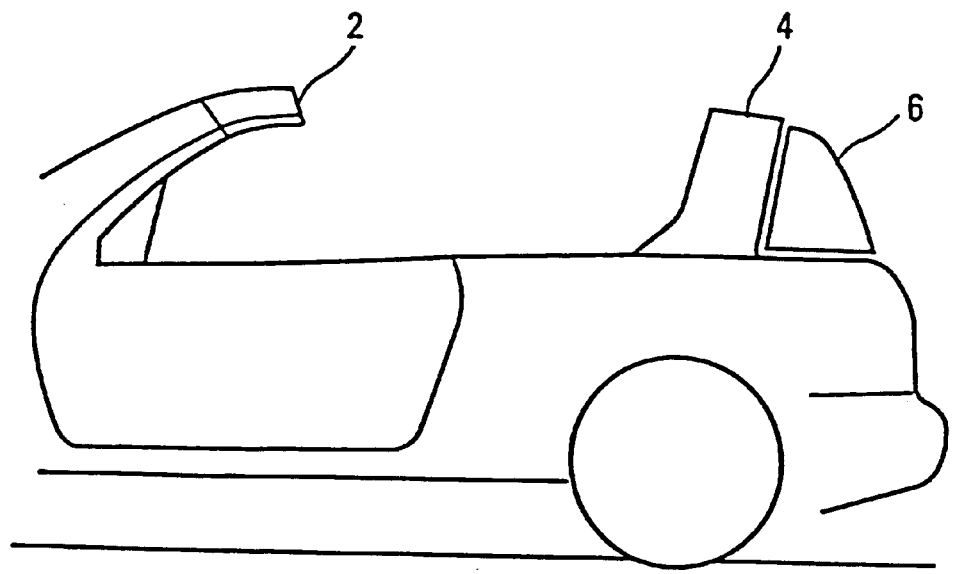

The rear part 6 could be fixed, rather than pivoting toward the trunk 5, as shown in FIG. 9, provided that its shape enabled the roof parts 8, 9 to move past it.

What is claimed is:

1. Retractable roof for horsebox, panel truck or station wagon type vehicles, including a roof (1) extending between a top edge (2) of a windshield and a top edge (3) of an upstanding arch member (4) above a front part of a trunk (5) and an at least partially glazed rear part (6) extending between the arch member (4) and a rear (7) of the trunk, characterized in that the roof (1) is in two parts (8, 9), a first part 8 and a second part 9, the first part (8) near the arch member (4) being connected to a lateral part (10) of the vehicle by two articulated arms (11, 12) mobile between an upright position in which said first part (8) of the roof is in front of the arch member (4) and a position swung toward the rear in which said arms (11, 12) and said first part (8) of the roof are in the trunk (5), the second part (9) of the roof being connected to the first part (8) by means for moving and sliding rearwardly the second part (9) of the roof over the first part (8) when the arms swing so that in their swung position in the trunk, the first and second roof parts are partially nested within each other.

2. Retractable roof according to claim 1 characterized in that said rear part (6) between the arch member (4) and the rear (7) of the trunk (5) pivots about an axis (13) near the rear top edge (7) of the trunk (5) so that it can be swung into the trunk (5).

3. Retractable roof according to claim 2 characterized in that it includes means for automatically and successively swinging said rear part (6) toward an inside of the trunk (5), swinging said arms (11, 12) toward the inside of the trunk (5) and simultaneously moving the second part (9) of the roof over the first part (8).

4. Retractable roof according to claim 1 characterized in that the second part (9) of the roof is moved over the first part (8) by a pivoting link (15) providing an articulated connection between the two roof parts (8, 9) and by a slide (16) along the first part (8) of the roof for guiding sliding of the second part (9) of the roof over the first part (8) of the roof.

5. Retractable roof according to claim 4 characterized in that the link (15) is caused to pivot by angular motion of the arm (11) connected to first part (8) of the roof nearest the second part (9) of the roof.

6. Retractable roof according to claim 5 characterized in that an end of said arm (11) carries a gear (17) meshing with a gear (18) carried by an end of the link (15) via an intermediate gear (19).

7. The retractable roof according to claim 4 wherein an end of said arm carries a gear meshing with a gear carried by an end of the pivoting link via an intermediate gear.

8. Retractable roof according to claim 7 characterized in that a front part (16a) of the slide (16) has a circular arc shape to enable the second part (9) of the roof to be offset in the upward direction when the roof is opened.

9. Retractable roof according to claim 8 characterized in that, when a roller (21) on an arm (20) is engaged in the circular arc part (16a), the arm (20) bears against a pivoted finger (22) spring-loaded by a spring (23) urging the arm (20) upward.

10. The retractable roof according to claim 1 characterized in that, when a roller on the member, is engaged in a circular arc portion, the member bears against a pivoted finger spring-loaded by a spring urging the member upward.

11. Retractable roof according to claim 10 characterized in that a seat back (24) is pivoted by a mechanism connecting one of the arms (12) connected to the first part (8) of the roof to the seat back (24).

12. Retractable roof according to claim 11 characterized in that said mechanism includes a lug (25) connected to an end of the arm (12) opposite the first roof part (8) whose end is engaged in a groove (27) attached to the seat back.

13. The retractable roof according to claim 1 characterized in that said mechanism includes a lug connected to an end of the arm opposite the first roof part whose end is engaged in a groove attached to a seat back.

* * * * *